Sept. 17, 1963 E. G. HEDGER 3,104,356

FM SIGNAL-TO-NOISE MONITORING SYSTEM

Filed April 26, 1961

INVENTOR.
EARL G. HEDGER
BY
ATTORNEYS 3,104,356
FM SIGNAL-TO-NOISE MONITORING SYSTEM
Earl G. Hedger, San Diego, Calif., assignor to the United States of America as represented by the Secretary of the Navy
Filed Apr. 26, 1961, Ser. No. 105,831
4 Claims. (Cl. 325—31)
(Granted under Title 35, U.S. Code (1952), sec. 266)

The invention described herein may be manufactured and used by or for the Government of the United States of America for governmental purposes without the payment of any royalties thereon or therefor.

This invention relates to a system for monitoring the output signal of a frequency-modulation detector.

In communication systems employing radio links it is common to stop "reading" a received signal when the received signal drops below a certain voltage level. The received signal is often measured by measuring the voltage drop across a grid resistor in one of the intermediate-frequency amplifiers in the receiver. The signal measured at this point may be modulated in a number of undesired ways and the signal may include white noise, atmospheric noise, adjacent channel noise, co-channel noise and impulsive noise. The meter has no way of discerning what portion of the measured signal constitutes noise and what portion constitutes wanted signal, it merely measures the total. When this type of monitoring is employed a signal may be ignored when the received signal strength drops below the preset level even though the signal-to-noise ratio is such that the wanted signal is intelligible.

It is an object of this invention to provide a monitoring system that operates on a signal-to-noise basis rather than a total signal amplitude basis.

It is an object of this invention to provide a system for measuring noise in the output of a frequency-modulation detector.

It is an object of this invention to provide a system for reducing the transmission error rate in a communication system.

It is still another object of this invention to provide a switching circuit which is controlled by the noise in the output of a frequency-modulation detector.

Other objects and advantages of the invention will be apparent from a study of the following specifications, read in connection with the accompanying drawing wherein.

Probably the most salient feature of a frequency-modulation system is its noise-suppressing property. This undoubtedly prompted Major Armstrong to label his original paper on frequency modulation, given in 1935, "A Method of Reducing Disturbances in Radio Signalling by a System of Frequency Modulation."

When an interfering signal is added to a wanted carrier signal the resultant signal has unwanted amplitude and frequency variations. A frequency-modulation system is adapted to effectively suppress such an interfering signal. The limiter(s) in a frequency-demodulation system, such as in a F.M. receiver, removes the amplitude variations. While the frequency variations due to the interfering signal are not reduced by the limiter their effect on the wanted carrier signal is minimized by the frequency-modulation detector. The ratio of wanted carrier signal to interfering signal measured before the frequency-modulation detector is usually not the same ratio as found at the output of the detector. The signal-to-noise ratio at the output of the frequency modulation detector is found by dividing the frequency deviation of the wanted carrier signal with that deviation caused by the interfering signal. The ratio of signal amplitudes at the input of the detector will affect the ratio of deviations but the two ratios will not necessarily be the same. The greater the wanted carrier signal amplitude with respect to the amplitude of the interfering signal, at the detector input, the greater will be the signal-to-noise ratio at the detector output. When the amplitude of the wanted carrier is twice that of the interfering signal the ratio of wanted signal to interfering signal at the output of the frequency-modulation detector could be, for example, one thousand to one.

The noise-suppressing properties of frequency modulation apply when the wanted carrier signal level at the frequency-modulation detector is greater than the noise level. When the noise level exceeds the wanted carrier signal level, the noise suppresses the signal. The noise-suppressing property is often labelled "quieting." A detailed explanation of the noise-suppressing properties of frequency modulation may be found in pages 20–28 of "Standard FM Handbook" edited by Milton B. Sleeper, published by FM Company, Great Barrington, Massachusetts (1946).

Figure 1:
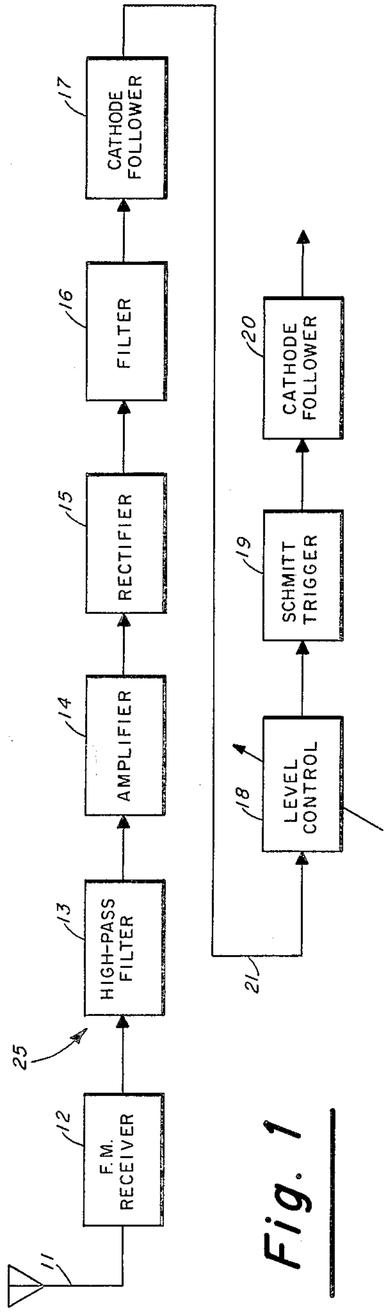
FIG. 1 is a block diagram of the invention.

In this invention a high-pass filter 13, shown in FIG. 1 is coupled to the output of a frequency-modulation detector such as a discriminator found in a F.M. receiver 12. The detector is part of a communication system receiving a frequency-modulated signal of fixed deviation. The high-pass filter is tuned to by-pass the highest fundamental modulation frequency received and the first five harmonics of the highest fundamental modulation frequency. For example, if the desired signal reaches but never exceeds a modulation frequency of five kilocycles, the filter cut-off frequency should be 25 kilocycles.

Since the received signal has a fixed deviation the output at the frequency-modulation detector, but for interfering signals, is constant. The high-pass filter 13 filters out the majority of the fixed deviation signal. That portion of the fixed-deviation signal that passes the filter, if any, is of a constant amplitude. Any other signal that passes the filter can be labelled noise as it interferes with the fixed deviation signal and is not desired. The output of the high-pass filter is amplified in an amplifier which can be, for example, a grounded-cathode amplifier or a common-emitter amplifier. The amplified noise is rectified in rectifier 15 which is preferably an ordinary full-wave, single-phase rectifier of the type shown on page 552, the third edition, of Radio Engineering by F. E. Terman, published by McGraw-Hill Book Company, Inc., New York, New York (1947). The pulsating voltage developed by rectifier 15 is smoothed in smoothing filter 16 which can be a resistance-capacitance filter. The output voltage from the filter 16 is fed into a cathode-follower amplifier 17 for impedance matching purposes and the "amplified" voltage is fed to a level control 18 which is adjustable and controls the voltage level of the signal applied to the next stage. The level control can be an ordinary cathode-follower amplifier with the full resistance of a potentiometer used as the cathode resistor and the adjustable potentiometer wiper used as the output terminal of the cathode follower and the adjustable level control. The output signal from the adjustable level control 18 is fed to a conventional Schmitt trigger circuit 19. Such a circuit is described in detail on pages 57–59 of "Time Bases" by O. S. Puckle, published by John Wiley and Sons, Inc., New York, New York. The characteristics of a Schmitt trigger circuit, as clearly described in the above mentioned text, is to deliver a rectangular pulse having a fast rise and fall time whenever the input signal exceeds a predetermined level, the length of said rectangular pulse being determined by the period the input signal exceeds the predetermined level. The output of a Schmitt trigger circuit is binary in nature, that is, it assumes one voltage level or another, there are no in between gradations. It is like an ordinary flip-flop circuit in that respect. The output of the Schmitt trigger 19 is coupled to a cathode follower 20 for impedance purposes. The output of cathode follower 20 is of course binary just as is the output of the Schmitt trigger. The output voltage can be used in a number of different ways. The cathode follower can be connected to a visual indicator such as a neon-bulb type indicator (not shown) so that the bulb illuminates when the Schmitt trigger fires and extinguishes when the trigger circuit switches back to its former or quiescent state.

The output of the cathode follower 20 can be used to control a gate circuit such as a gated amplifier. A gated amplifier (not shown) can be connected to the output of the frequency-modulation detector and the output of cathode follower 20 used to control the gate so that the amplifier is cut off and does not amplify the detector output signal when the noise level on lead 21 causes Schmitt trigger 19 to fire.

Figure 2:
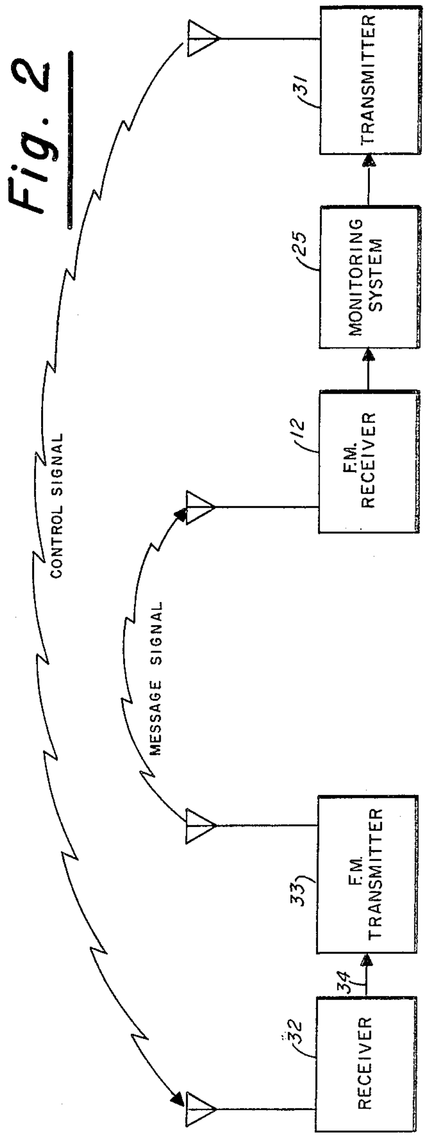
FIG. 2 is a block diagram of a communication system employing the invention.

The block diagram in FIG. 2 shows still another way in which the instant invention can be employed. F.M. receiver 12, monitoring system 25 and transmitter 31 form a station remote from transmitter 32 and F.M. transmitter 33. Transmitter 31 transmits a continuous control signal, which is non-message bearing, to receiver 32. F.M. transmitter 33 transmits a message signal to receiver 12 as long as receiver 32 properly receives the control signal from transmitter 31 and so "advises" F.M. transmitter 33 by means of interconnecting lead 34. Monitoring system 25, connected to the detector of F.M. receiver 12 and to transmitter 25 will shut off the latter if the noise level becomes sufficient to trigger the Schmitt trigger in the monitoring system and it will turn on the transmitter as soon as the Schmitt trigger circuit switches back to its prior or quiescent state. When transmitter 31 is shut off, transmitter 33 will be shut off and the message signal will not be sent to receiver 12 until the noise level on the output of receiver 12 is reduced to the point where the monitoring system enables transmitter 31 to start operating again and so forth. From the above it is apparent that a message signal will be transmitted to receiver 12 only when the latter can intelligibly copy the signal. Transmission error rate is thus greatly reduced. Of course, an additional monitoring system 25 could be the means used to enable receiver 32 to advise transmitter 33 when to transmit.

Level control 18 can be adjusted so that any desired level of noise will fire Schmitt trigger 19. The system can be calibrated in the following manner: remove antenna 11 and connect an F.M. signal generator to the antenna terminal of the receiver; cause the generator to generate a frequency-modulated signal of fixed deviation similar to that anticipated in normal operation of the receiver; reduce the level of the generated signal to the lowest level where the signal is still fully intelligible at the frequency-modulation detector in the receiver; adjust the level control 18 so that Schmitt trigger will fire if any more noise appears at the output of cathode follower 17; remove the generator and replace the antenna. Since the desired signal received by receiver 12 is a frequency-modulated signal of fixed deviation, it produces a signal at the frequency-modulation detector of constant amplitude. Any interfering signal in the receiver, regardless of whether its atmospheric noise, impulsive noise, receiver noise, and adjacent-channel signal or co-channel signal, will tend to increase the amplitude of the signal at the output of the receiver and will be recognized as noise by the system. The Schmitt trigger will fire whenever the preset firing level is exceeded. The system is not misled by interfering signals and readily distinguishes the desired signal from noise. Noise conditions change from time to time and from place to place. The system is extremely flexible and can be adjusted to derive the maximum performance from a frequency-modulation detector for any given noise conditions.

It should be understood, of course, that the foregoing disclosure relates to only a preferred embodiment of the invention and that it is intended to cover all changes and modifications of the example of the invention herein chosen for purposes of the disclosure, which do not constitute departures from the spirit and scope of the invention.

I claim:

1. In a frequency-modulation receiving system for receiving a message signal of fixed deviation intermixed with one or more interfering signals such as atmospheric noise, a co-channel signal, an adjacent channel signal or impulse noise, said system having a frequency modulation detector with an output, said system having a gate circuit with a signal input and a control input, said output of said detector being coupled to said signal input of said gate circuit comprising in combination, filter means having an input and an output for bypassing signals contained within a predetermined band of frequencies, said output of said detector being coupled to said input of said filter means, means coupled to said output of said filter means for converting any input signals to a direct-current voltage, a bistable pulse generator having an input and an output, means for feeding said direct-current voltage to said input of said pulse generator, and said output of said pulse generator being coupled to said control input of said gate circuit.

2. In a monitoring system for monitoring the noise in the output of a frequency-modulation detector, a high-pass filter having a cut-off frequency that is greater than the highest desired fundamental frequency encountered by said filter, said filter having an input adapted to be connected to a frequency-modulation detector and an output, means coupled to said filter output for amplifying all filter-output signals, means coupled to said amplifying means for rectifying all amplified signals, a smoothing filter coupled to said rectifying means, an adjustable signal-level control having an input and an output, means for coupling said smoothing filter to said level control input, a Schmitt trigger circuit, and means for coupling said trigger circuit to the output of said level control.

3. In combination, a high-pass filter having an input and an output, said input being adapted to connect to the output of a frequency modulation detector, means for amplifying having an input and an output, said amplifying means input being coupled to said filter output, a rectifier having an input and an output, said rectifier input being coupled to said amplifying means output, a filter having an input and an output, said filter input being connected to said rectifier output, an adjustable level control having an input and an output, means for coupling said filter output to the input of said level control, and a trigger circuit coupled to the output of said level control.

4. In a frequency-modulation system using a message signal of fixed deviation and having a frequency-modulation detector with an input and an output, means coupled to said output for blocking said message signal and passing interfering signals, means coupled to said blocking means for rectifying said interfering signals, a filter coupled to said rectifying means, means coupled to said filter for adjusting the amplitude of the filter output signals, a Schmitt trigger circuit, said trigger circuit being connected to said adjusting means and adapted to switch whenever said interfering signals reach a predetermined amplitude.

References Cited in the file of this patent

UNITED STATES PATENTS

| | | |
|---|---|---|
| 2,372,934 | Campbell | Apr. 3, 1945 |
| 2,425,968 | Tunick | Aug. 19, 1947 |
| 2,493,446 | Crosby | Jan. 3, 1950 |
| 2,770,721 | Clark | Nov. 13, 1956 |
| 2,967,908 | Gray et al. | Jan. 10, 1961 |
| 3,001,064 | Alexis et al. | Sept. 19, 1961 |
| 3,054,895 | Forsyth | Sept. 18, 1962 |